W. A. TURBAYNE.
ELECTRICAL SYSTEM OF DISTRIBUTION.
APPLICATION FILED SEPT. 14, 1906.
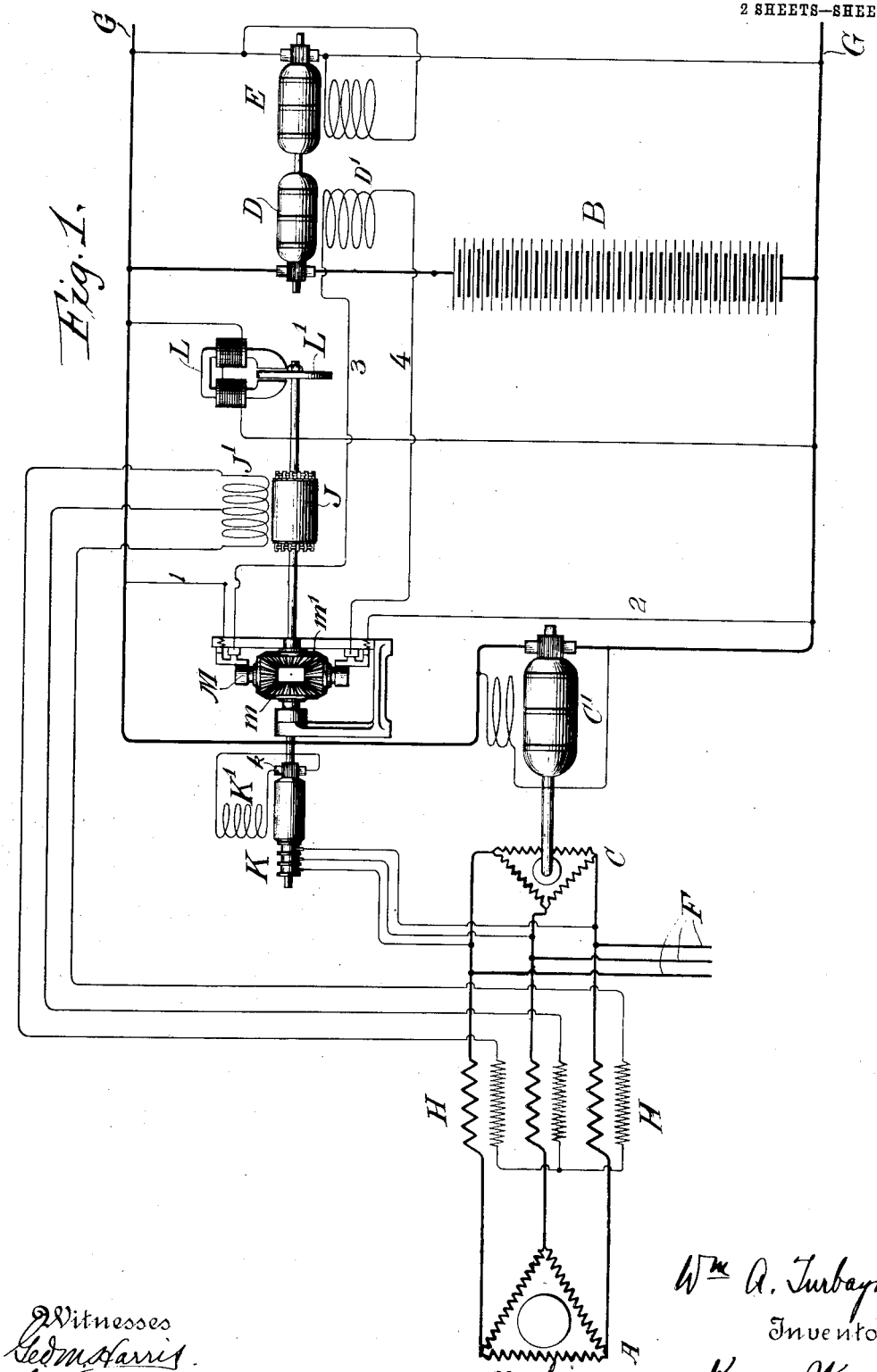

W. A. TURBAYNE.
ELECTRICAL SYSTEM OF DISTRIBUTION.
APPLICATION FILED SEPT. 14, 1906.
957,523.
Patented May 10, 1910.
2 SHEETS—SHEET 2.
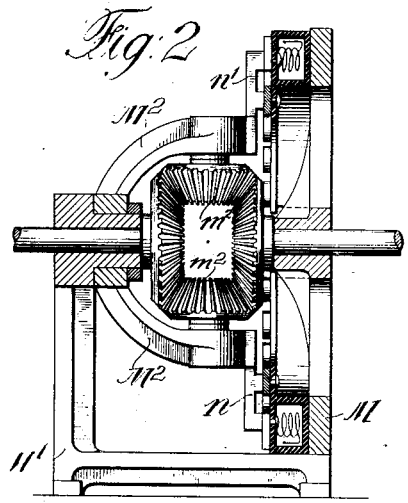
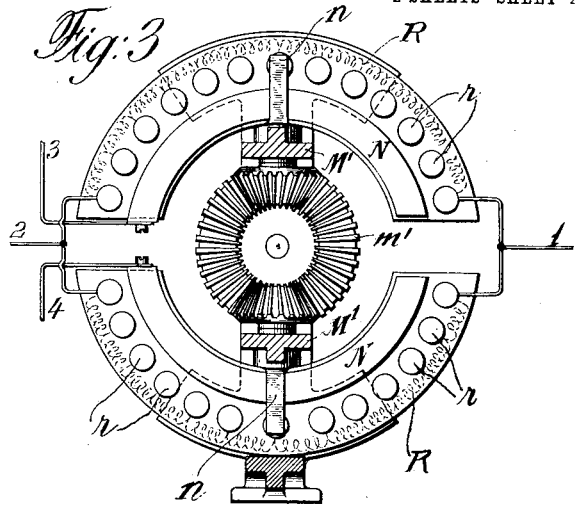
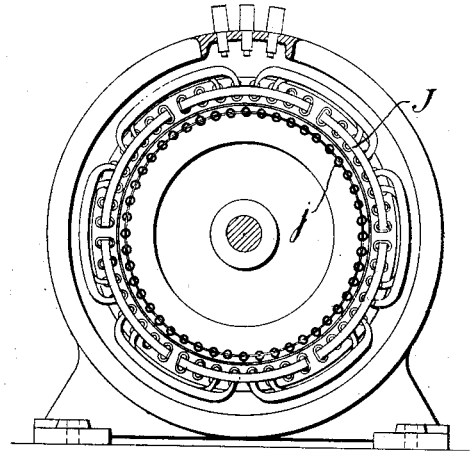
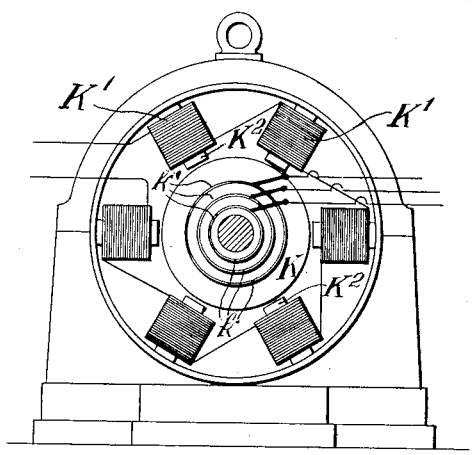
Witnesses
Geo. M. Harris
John O. Gumpler
Wm. A. Turbayne
Inventor
By his Attorneys Kenyon & Kenyon

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

957,523.   Specification of Letters Patent.   Patented May 10, 1910.

Application filed September 14, 1906.   Serial No. 334,582.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and especially to the automatic regulation thereof.

Specifically I have devised my improvements with relation to the regulation of the action of a storage battery used as a compensating influence with alternating current systems of distribution, but various features of my invention are applicable to other types of systems, especially to systems where it is desirable to regulate a dynamo responsively to changes of electrical condition of an alternating current circuit.

One feature of my invention resides in the provision of means whereby in a system having a compensatory battery connected in operative relation with an alternating current generator the battery action is automatically regulated by changes of current strength of the alternating current generator, the regulation being continuously changing until the generator current is brought to a predetermined value. To this end I provide apparatus for regulating the battery action so arranged and controlled by a coil or coils in the circuit of the alternating current generator that when any current of the latter is at its predetermined value, the apparatus is balanced, whereas, whenever the current of the alternating current generator has departed from its predetermined value the apparatus becomes unbalanced and continuously changes its regulating action until the predetermined value of alternating current generator current is again attained. I prefer that this apparatus shall act directly or indirectly upon the circuit of the field of a booster in series with the battery so as to regulate the action of the battery by regulating the field strength of the booster and therefore the electro-motive-force generated thereby.

Another feature of my invention involves the apparatus whereby the booster or any other dynamo field may be regulated by fluctuations of current in an alternating current circuit. The specific apparatus that I have provided for this purpose comprises two alternating current motors connected to the end members of a differential gear and constructed, arranged and connected so that fluctuations in the alternating current circuit will produce relative differences of speed between the two motors, whereby when the two motors are at different speeds the planetary member of the differential gear will be rotated. The movement of the planetary member actuates a reversing rheostat connected in a direct current circuit, which circuit may be the field of a dynamo to be regulated or any other direct current regulating circuit. In the present case it is shown as the field circuit of the booster. Preferably one of the two motors is a synchronous motor while the other motor is an induction motor having a less number of poles and therefore a higher maximum speed than the synchronous motor. In order that the speed of the induction motor below synchronism may vary with the fluctuations of current in the alternating current circuit, I connect its rotating field to be responsive to such fluctuations and connect the rotor of the induction motor to a load, which, in the present instance, is an electro-magnetic brake serving as a constant load. In this way when the electrical condition of the alternating current circuit is at its desired value, the synchronous and induction motors are rotating at the same speed but are actuating the gears of the differential gearing in opposite directions so that the planetary member of the gearing is stationary and the rheostat is fixed in position. As soon, however, as there is a fluctuation in the alternating current circuit the induction motor will either increase or decrease in speed and cause a movement in one direction or another of the planetary member of the gearing and therefore of the rheostat. This movement will continue until the condition of the alternating current circuit is again at the desired point. The greater maximum speed of the induction motor is, in the present instance, obtained by providing it with a less number of poles than the synchronous motor. While I have described the specific features of this regulating apparatus I desire it to be understood that I consider this apparatus to be broadly novel and that it may be modified in many respects without departing from the scope of the present invention, and may be regulated either by current changes of a system or by voltage changes of a system.

Referring to the drawings Figure 1 is a diagrammatic illustration of a system embodying the various features of my invention. Figs. 2 and 3 are enlarged vertical and horizontal sections respectively of the differential gearing and reversing rheostat. Fig. 4 is an end view of one form of induction motor which may be used as one of the two motors I have referred to. Fig. 5 is an end view of one form of synchronous motor which may be used as the other of the motors referred to.

Referring to Fig. 1 the main alternating current generator is indicated at A. The compensatory battery is indicated at B. At C and C' respectively are indicated the alternating and direct current ends of a suitable rectifying device connecting the generator and battery in operative relation. It is immaterial to the present invention whether this rectifying device takes the form of a motor generator (as illustrated) or a rotary converter, or of ordinary commutating apparatus.

The armature of the booster in series with the battery is shown at D with its field winding D'. This booster is preferably operated by motor E mechanically connected to the armature of the booster. In the present instance I have shown the field winding of the booster directly connected across the direct current circuit, the regulation being effected by the variation of resistance in the field circuit and the reversal of current flow in that circuit. In most large systems of this general character now installed the booster field is regulated by the regulation of intermediate exciters or regulating dynamos, but as this is a well known alternative I have chosen the simplest form for illustration.

At F I have shown an alternating current work circuit, while, if desired, there may also be a direct current work circuit connected to the leads G. Either or both work circuits may be supplied by the system.

H are series transformers whose primaries are connected to receive the current of the main generator and whose secondaries supply current to the field winding J', hereinafter described. The current in primaries H being that of the main generator, the current supplied to the winding J' will at all times bear the same proportion to the current of the main generator. This is the alternating current regulating circuit of the system, the current therein being proportional to the current of the generator and, as will appear, affecting the regulating apparatus proportionally. I have shown this regulating circuit as a very simple circuit. It will be understood that additional transformers may be employed in this regulating circuit for insulating or other purposes and that devices for adjusting the action of this circuit may be added without departing from the present invention.

K is a synchronous motor connected across the alternating current circuit and therefore always having a speed that is synchronous with that of the main generator being unaffected by changes of electrical condition of the alternating current circuit. J is the armature of an induction motor and J' the field thereof. In Figs. 4 and 5 I have shown conventional forms for these motors, the induction motor preferably having a closed circuit winding $j$ on its rotor element and having its field winding connected to the different phases of the alternating current circuit so that a rotating field may be produced. The synchronous motor has a direct current field K' which is in the present case supplied by a commutator $k$ carried by the armature of the motor, while current from the alternating current circuit is supplied to the armature through the collector rings $k'$. It will be noted that the induction motor, as shown in Fig. 4, is wound so as to have four poles, whereas the synchronous motor, as shown in Fig. 5, has six poles $K^2$. This enables the induction motor, although ordinarily operating well below synchronous speed, to rotate at a higher actual speed than the synchronous motor. In order that the induction motor may vary in speed proportionally to the variations of current supplied to its field I have supplied a constant load consisting of an electro-magnet L, energized in the present instance from the direct current circuit, with its poles embracing the disk L'. As this is a well known form of electro-magnet brake it is not necessary to describe its action in the present application. The synchronous motor is mechanically connected to the end gear $m$ of a differential gear M and the rotor of the induction motor is connected to the other end member $m'$ of said gearing. The shafts connected to these gears are supported in the frame M' of the combined gearing and rheostat. Supported by arms M² which journal on the frame M' are beveled gears $m^2$. These are independently journaled in the arms M² so that they have both a rotary movement on their own journals and a bodily movement around the axes of the end members of the gear. These intermediate gears with the arms supporting them therefore constitute the planetary member of the gear. The movable arms M² also constitute the movable member of a rheostat, these arms being connected to bridging contacts $n$ and $n$ of a rheostat carried by the frame M'. This rheostat has two sets of resistances R connected at their opposite ends through conductors 1 and 2 with opposite sides of the direct current circuit.

The rheostat is also provided with two contacts N connected through conductors 3 and 4 with opposite sides of the field winding D' of the booster, the dynamo that is in the present instance to be regulated. The bridging contacts $n$ each connect one of the continuous contacts N with one or other of the contacts $r$ connected to different portions of the resistances. When the planetary member of the gear is in the position most clearly illustrated in Fig. 3, with the bridging contacts $n$ disposed centrally with relation to the resistances, no current will pass to the booster field because the potential of the two terminals of that field, the contacts $n$, is the same. If the planetary member of the gearing is moved so that the upper contact $n$ (Fig. 3) is moved to the right, then because the resistance on opposite sides of the two contacts has been lessened, there will be a flow of current from the conductor 1 through a portion of the upper resistance, then through the upper contact $n$ to the conductor 3, through the field D', through the conductor 4 to the lower contact $n$ and thence to the conductor 2 on the other side of the circuit. The farther the movable member of the rheostat is moved in this direction the greater will be this current. On the other hand, if the movable member of the rheostat is moved in the opposite direction from the central position shown the current for a like reason will pass from the conductor 1 through the booster field in the opposite direction.

From the foregoing the operation of the system will be manifest. The system is so adjusted that whenever the current in the primaries of transformers H is at the predetermined value at which it is desired to maintain the main generator then the current in the field winding J' will be such that the motor will run at the same speed as the synchronous motor K. Under these circumstances the planetary member of the gear will be stationary because the two end members are rotating in opposite directions at the same rate of speed. Each beveled gear $m^2$ will simply rotate on its own journals without causing any movement of the arm $M^2$. When, however, some change in the working circuit or in the condition of the battery or elsewhere in the system causes a tendency for the generator load to increase or decrease, the current in the transformers H correspondingly increases or decreases and the speed of the motor J correspondingly increases or decreases. Immediately the difference in speed thus produced between the gears $m$ and $m'$ causes a movement in the proper direction of the arm $M^2$ and the current in the booster field is thereby changed in value, and, if need be, in direction. As long as the current of the main generator is different from that for which the system is adjusted, the rheostat will continue to move until the battery is charging or discharging sufficiently to restore the desired value of generator current. In practice the planetary member of the gearing and therefore the rheostat will be constantly moving backward and forward inasmuch as the fluctuations on such systems are more or less continuous, but the tendency is always to continue moving the rheostat in the proper direction to maintain the exact value of generator current desired.

I have shown a simple form of differential gearing, which I prefer, this gearing and the motors being so arranged that the speed of the motors will be equal and opposite when the desired position of equilibrium is established. It is obvious, however, that this is a matter of design and construction and may be departed from without affecting the scope of my invention.

Having thus described my invention, what I claim as new and desire to secure by Letters Patent is:—

1. The combination of an alternating current generator, a storage battery and means for operatively connecting the same to the generator, an alternating current synchronous motor, an alternating current induction motor having less poles than the synchronous motor, means for varying the speed of the latter responsively to changes of electrical condition of the alternating current circuit, and regulating apparatus for the battery controlled responsively to relative speed variations of the two motors.

2. The combination of an alternating current generator, a storage battery and means for operatively connecting the same to the generator, an alternating current synchronous motor, an alternating current induction motor having less poles than the synchronous motor, means for varying the speed of the latter responsively to changes of current strength of the alternating current generator, and regulating apparatus for the battery controlled responsively to relative speed variations of the two motors.

3. The combination of an alternating current generator, a storage battery and means for operatively connecting the same to the generator, an alternating current synchronous motor, an alternating current induction motor having its field so connected as to be responsive to fluctuations in the alternating current circuit, a load connected to the induction motor, and regulating apparatus for the battery controlled responsively to relative speed variations of the two motors.

4. The combination of an alternating current generator, a storage battery and means for operatively connecting the same to the generator, an alternating current synchronous motor, an alternating current induction motor having its field so connected as to be responsive to fluctuations of current strength of the alternating current generator, a load connected to the induction motor, and regulating apparatus for the battery controlled responsively to relative speed variations of the two motors.

5. The combination of an alternating current generator, a storage battery and means for operatively connecting the same to the generator, an alternating current synchronous motor, an alternating current induction motor having a higher maximum speed than that of the synchronous motor and having its field so connected as to be responsive to fluctuations in the alternating current circuit, a load connected to the induction motor, and regulating apparatus for the battery controlled responsively to relative speed variations of the two motors.

6. The combination of an alternating current generator, a storage battery and means for operatively connecting the same to the generator, an alternating current synchronous motor, an alternating current induction motor having a less number of poles than the synchronous motor and having its field so connected as to be responsive to fluctuations in the alternating current circuit, a load connected to the induction motor, and regulating apparatus for the battery controlled responsively to relative speed variations of the two motors.

7. The combination of an alternating current generator, a storage battery and means for operatively connecting the same to the generator, two alternating current motors having different synchronous speeds, means for causing the motor having the higher synchronous speed to operate at varying speeds below synchronism as the electrical condition of the alternating current circuit varies, and regulating apparatus for the battery controlled responsively to relative speed variations of the two motors.

8. A dynamo to be regulated, an alternating current circuit, a pair of motors, one motor being an induction motor having its field connected to be responsive to changes in said alternating current circuit, and apparatus for regulating the field strength of said dynamo controlled responsively to the relative variations of speed of the two motors.

9. A dynamo to be regulated, an alternating current circuit, a pair of motors, one motor being an induction motor having its field connected to be responsive to changes in said alternating current circuit, a load connected to said induction motor, and apparatus for regulating the field strength of said dynamo controlled responsively to the relative variations of speed of the two motors.

10. A direct current dynamo to be regulated, an alternating current circuit, a pair of motors, one motor being an induction motor having its field connected to be responsive to changes in said alternating current circuit, a load connected to said induction motor, a direct current source of supply and apparatus electrically connected therewith for regulating the field strength of said dynamo controlled responsively to the relative variations of speed of the two motors.

11. A dynamo to be regulated, an alternating current circuit, a pair of motors, one motor being an induction motor having its field connected to be responsive to changes in said alternating current circuit, a load connected to said induction motor, a differential gear connected to the two motors, and field regulating apparatus for the dynamo actuated by one member of the gearing.

12. A direct current dynamo to be regulated, an alternating current circuit, a pair of motors, one motor being an induction motor having its field connected to be responsive to changes in said alternating current circuit, a load connected to said induction motor, a direct current source of supply, field regulating apparatus for the dynamo electrically connected therewith, a differential gearing connected to the two motors and operative connections between one member of said gear and said apparatus.

13. A dynamo to be regulated, an alternating current circuit, an alternating current induction motor having a less number of poles than the synchronous motor and having its field connected to be responsive to changes in the alternating current circuit, and apparatus for regulating the field strength of said dynamo controlled responsively to the relative variations of speed of the two motors.

14. A direct current dynamo to be regulated, an alternating current circuit, an alternating current synchronous motor, an alternating current induction motor having a less number of poles than the synchronous motor and having its field connected to be responsive to changes in the alternating current circuit, a direct current source of supply and apparatus electrically connected therewith for regulating the field strength of said dynamo controlled responsively to the relative variations of speed of the two motors.

15. A dynamo to be regulated, an alternating current circuit, an alternating current synchronous motor, an alternating current induction motor having a less number of poles than the synchronous motor and having its field connected to be responsive to changes in the alternating current circuit, a differential gear connected to the two motors, and field regulating apparatus for the dynamo, actuated by one member of the gearing.

16. A direct current dynamo to be regulated, an alternating current circuit, an alternating current synchronous motor, an alternating current induction motor having a less number of poles than the synchronous motor and having its field connected to be responsive to changes in the alternating current circuit, a direct current source of supply, apparatus electrically connected therewith for regulating the field strength of said dynamo, a differential gearing operated by the motors, and operative connections between one member of said gearing and said apparatus.

In testimony whereof, I have signed my name to this specification, in the presence of two subscribing witnesses.

WILLIAM A. TURBAYNE.

Witnesses:
W. D. PORTER,
H. KOEHLER.